United States Patent
Kohsaka et al.

(10) Patent No.: US 11,220,722 B2
(45) Date of Patent: Jan. 11, 2022

(54) STEEL SHEET AND METHOD FOR MANUFACTURING THE SAME

(71) Applicant: JFE Steel Corporation, Tokyo (JP)

(72) Inventors: Noriaki Kohsaka, Tokyo (JP); Yoshikazu Suzuki, Tokyo (JP); Takeo Kikuchi, Tokyo (JP); Yoshimasa Himei, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 237 days.

(21) Appl. No.: 16/324,970

(22) PCT Filed: Aug. 29, 2017

(86) PCT No.: PCT/JP2017/030846
§ 371 (c)(1),
(2) Date: Feb. 12, 2019

(87) PCT Pub. No.: WO2018/043453
PCT Pub. Date: Mar. 8, 2018

(65) Prior Publication Data
US 2019/0185954 A1 Jun. 20, 2019

(30) Foreign Application Priority Data

Aug. 30, 2016 (JP) .............................. JP2016-168116

(51) Int. Cl.
| | |
|---|---|
| C21D 8/02 | (2006.01) |
| C21D 9/46 | (2006.01) |
| C22C 38/06 | (2006.01) |
| C22C 38/58 | (2006.01) |
| C22C 38/60 | (2006.01) |
| C22C 38/00 | (2006.01) |
| C22C 38/02 | (2006.01) |
| C22C 38/04 | (2006.01) |
| C22C 38/12 | (2006.01) |
| C22C 38/14 | (2006.01) |
| C22C 38/22 | (2006.01) |
| C22C 38/28 | (2006.01) |
| C22C 38/32 | (2006.01) |
| C22C 38/44 | (2006.01) |
| C22C 38/46 | (2006.01) |
| C22C 38/48 | (2006.01) |
| C22C 38/50 | (2006.01) |

(Continued)

(52) U.S. Cl.
CPC ........... *C21D 8/0263* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 9/46* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/12* (2013.01); *C22C 38/14* (2013.01); *C22C 38/22* (2013.01); *C22C 38/28* (2013.01); *C22C 38/32* (2013.01); *C22C 38/38* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C22C 38/60* (2013.01); *C23C 2/02* (2013.01); *C23C 2/06* (2013.01); *C23C 2/28* (2013.01); *C23C 2/40* (2013.01); *C21D 2211/001* (2013.01); *C21D 2211/004* (2013.01); *C21D 2211/005* (2013.01); *C21D 2211/008* (2013.01); *C22C 18/00* (2013.01); *C22C 18/04* (2013.01)

(58) Field of Classification Search
CPC .. C21D 8/0263; C21D 8/0205; C21D 8/0226; C21D 8/0236; C21D 9/46; C21D 6/005; C21D 6/008; C21D 2211/001; C21D 2211/004; C21D 2211/005; C21D 2211/008; C21D 2211/003; C23C 2/02; C23C 2/06; C23C 2/28; C23C 2/40; C22C 18/00; C22C 18/04
See application file for complete search history.

(56) References Cited

U.S. PATENT DOCUMENTS

| | | | |
|---|---|---|---|
| 10,066,274 B2 | 9/2018 | Kasuya et al. | |
| 2004/0055667 A1* | 3/2004 | Takada | C21D 8/0278 148/533 |

(Continued)

FOREIGN PATENT DOCUMENTS

| | | |
|---|---|---|
| CN | 102149840 A | 8/2011 |
| CN | 103842545 A | 6/2014 |

(Continued)

OTHER PUBLICATIONS

Chinese Office Action with Search Report for Chinese Application No. 201780049491.0, dated Jun. 23, 2020, 8 pages.

(Continued)

*Primary Examiner* — Anthony J Zimmer
*Assistant Examiner* — Dean Mazzola
(74) *Attorney, Agent, or Firm* — RatnerPrestia

(57) ABSTRACT

Provided are a steel sheet having a tensile strength of 950 MPa or more and good toughness and a method for manufacturing the same.
The steel sheet has a specific composition and a metallographic structure containing: a ferrite area fraction of 30% or less (including 0%), a tempered martensite area fraction of 70% or more (including 100%), and a retained austenite area fraction of 4.5% or less (including 0%), wherein the average aspect ratio of an iron based carbide, precipitated in tempered martensite grains, having a grain size in the largest 10% is 3.5 or more.

19 Claims, No Drawings

(51) Int. Cl.
*C22C 38/54* (2006.01)
*C21D 6/00* (2006.01)
*C22C 38/38* (2006.01)
*C23C 2/06* (2006.01)
*C23C 2/40* (2006.01)
*C23C 2/28* (2006.01)
*C23C 2/02* (2006.01)
*C22C 18/04* (2006.01)
*C22C 18/00* (2006.01)

(56) References Cited

U.S. PATENT DOCUMENTS

| | | | |
|---|---|---|---|
| 2010/0252147 A1* | 10/2010 | Murakami | C21D 8/0447 148/332 |
| 2011/0030854 A1* | 2/2011 | Mizuno | C21D 1/25 148/504 |
| 2011/0048589 A1* | 3/2011 | Matsuda | C21D 8/04 148/645 |
| 2015/0274218 A1 | 10/2015 | Takagi et al. | |
| 2016/0237520 A1 | 8/2016 | Murata et al. | |
| 2016/0273066 A1* | 9/2016 | Sakakibara | C22C 38/02 |
| 2016/0319385 A1 | 11/2016 | Hasegawa et al. | |
| 2018/0057916 A1 | 3/2018 | Obata et al. | |
| 2018/0119240 A1* | 5/2018 | Tanaka | C22C 38/02 |

FOREIGN PATENT DOCUMENTS

| CN | 105579605 A | 5/2016 |
|---|---|---|
| EP | 2053140 A1 | 4/2009 |
| EP | 2216422 A1 | 8/2010 |
| EP | 2246456 A1 | 11/2010 |
| EP | 2251448 A1 | 11/2010 |
| EP | 2258887 A1 | 12/2010 |
| EP | 2325346 A1 | 5/2011 |
| EP | 2762596 A1 | 8/2014 |
| JP | 2010132945 A | 6/2010 |
| JP | 2012031466 A | 2/2012 |
| JP | 2015196891 A | 11/2015 |
| JP | 2015200006 A | 11/2015 |
| JP | 5858199 B2 | 2/2016 |
| KR | 20100105799 A | 9/2010 |
| WO | 2010109702 A1 | 9/2010 |
| WO | 2014077294 A1 | 5/2014 |
| WO | 2014185405 A1 | 11/2014 |
| WO | 2016103534 A1 | 6/2016 |
| WO | 2016103535 A1 | 6/2016 |
| WO | 2016132680 A1 | 8/2016 |

OTHER PUBLICATIONS

Extended European Search Report for European Application No. 17846458.2, dated Apr. 11, 2019, 8 pages.

Korean Grant of Patent for Korean Application No. 10-2019-7004070, dated Oct. 13, 2020, with translation, 4 pages.

International Search Report and Written Opinion for International Application No. PCT/JP2017/030846, dated Nov. 21, 2017—5 pages.

* cited by examiner

STEEL SHEET AND METHOD FOR MANUFACTURING THE SAME

CROSS REFERENCE TO RELATED APPLICATIONS

This is the U.S. National Phase application of PCT/JP2017/030846, filed Aug. 29, 2017, which claims priority to Japanese Patent Application No. 2016-168116, filed Aug. 30, 2016, the disclosures of these applications being incorporated herein by reference in their entireties for all purposes.

FIELD OF THE INVENTION

The present invention relates to a steel sheet and a method for manufacturing the same. The steel sheet according to the present invention combines a tensile strength (TS) of 950 MPa or more and excellent toughness. Therefore, the steel sheet according to the present invention is suitable for materials for skeletal members for automobiles.

BACKGROUND OF THE INVENTION

In recent years, from the viewpoint of global environmental protection, improvements in automotive fuel efficiency have been directed in the whole automotive industry for the purpose of regulating $CO_2$ emissions. Automotive weight reduction by the gauge reduction of parts used is most effective in improving the fuel efficiency of automobiles. Therefore, in recent years, the consumption of high-strength steel sheets for automotive parts has been increasing.

On the other hand, the toughness of steel sheets tends to deteriorate with an increase in strength. Therefore, steel sheets having toughness in addition to high strength are demanded. A steel sheet which does not meet these characteristics cannot be applied to automotive parts or the like because defects such as cracks occur in the formation of automotive members or the post-forming crashworthiness decreases significantly. The development of a steel sheet combining high strength and toughness is essential to lighten automotive parts and the like. Various techniques have been proposed for high-strength cold-rolled steel sheets and galvanized steel sheets.

For example, Patent Literature 1 describes that the following sheet is obtained by controlling the IQ distribution obtained by EBSD: a high-strength steel sheet which is excellent in low-temperature toughness; which meets C: 0.10% to 0.5%, Si: 1.0% to 3.0%, Mn: 1.5% to 3%, Al: 0.005% to 1.0%, P: more than 0% to 0.1%, and S: more than 0% to 0.05% on a mass basis, and which contains 10% to 50% polygonal ferrite and 5% or more retained austenite.

Patent Literature 2 describes that a high-strength galvanized steel sheet excellent in crashworthiness and bending workability is obtained in such a manner that C: 0.05% to 0.15%, Si: 0.01% to 1.00%, Mn: 1.5% to 4.0% P: 0.100% or less, S: 0.02% or less, Al: 0.01% to 0.50%, Cr: 0.010% to 2.000%, Nb: 0.005% to 0.100%, Ti: 0.005% to 0.100%, and B: 0.0005% to 0.0050% are contained on a mass basis such that Si, Mn, Cr, and B are contained within a regulated range; a metallographic structure which contains ferrite: 10% or less, bainitic ferrite: 2% to 30%, and martensite: 60% to 98% on an area fraction basis and which has a retained austenite percentage of less than 2% as determined by X-ray diffractometry is formed; the percentage of massive martensite adjacent to bainite only in the whole structure is set to 10% or less; and the difference in hardness between a position 100 μm apart from a surface in a thickness direction and a position 20 μm apart therefrom is regulated.

PATENT LITERATURE

PTL 1: Japanese Unexamined Patent Application Publication No. 2015-200006
PTL 2: Japanese Patent No. 5858199

SUMMARY OF THE INVENTION

In a technique proposed in Patent Literature 1, a large amount of retained austenite is contained and the retained austenite is converted into martensite by strain-induced transformation during bending. Since the martensite reduces the post-bending toughness, the post-bending toughness required in accordance with aspects of the present invention is not obtained by the technique proposed in Patent Literature 1.

In a technique proposed in Patent Literature 2, strength is obtained with a microstructure in which martensite is dominant. Since the martensite reduces the post-bending toughness, a required steel sheet is not obtained by the technique proposed in Patent Literature 2.

Aspects of the present invention have been made in view of such circumstances. It is an object according to aspects of the present invention to provide a steel sheet having a tensile strength of 950 MPa or more and good toughness and a method for manufacturing the same.

In order to solve the above problems, the inventors have intensively investigated requirements for steel sheets combining a tensile strength of 950 MPa and good toughness. The thickness of a steel sheet targeted in this case is 0.4 mm to 3.2 mm. Many of actual automotive members are bent. As a result of performing intensive investigations on the toughness of bent portions thereof, a result that toughness deteriorates when certain amounts of as-quenched martensite and retained austenite are present has been obtained. In particular, it has been conceived that martensite converted from retained austenite by plasticity-induced transformation during bending has very high hardness and therefore has a significant negative influence on toughness. Therefore, as a result of allowing tempered martensite to predominate and reducing retained austenite, good toughness has been obtained. In addition, it has become clear that coarse inclusions that are spherical are more appropriate than those that are flat. It has been found that coarse inclusions are mainly iron based carbides (cementite ($Fe_3C$), η-carbide ($Fe_2C$), χ-carbide ($Fe_{2.2}C$), and Σ-carbide ($Fe_{2.4}C$)) and facilitating precipitation in a low-temperature range is effective in controlling their morphology.

Aspects of the present invention have been completed on the basis of the above finding and is as summarized below.

[1] A steel sheet having, a composition containing C: 0.07% to 0.20%, Si: 0.01% to 2.0%, Mn: 1.8% to 3.5%, P: 0.05% or less, S: 0.005% or less, Al: 0.01% to 2.0%, N: 0.0060% or less, and Si+Al: 0.7% or more on a mass basis, the balance being Fe and inevitable impurities; and a metallographic structure containing: a ferrite area fraction of 30% or less (including 0%), a tempered martensite area fraction of 70% or more (including 100%), and a retained austenite area fraction of 4.5% or less (including 0%), wherein the average aspect ratio of an iron based carbide, precipitated in tempered martensite grains, having a grain size in the largest 10% is 3.5 or more.

[2] The steel sheet according to item [1], wherein the composition further contains one or two or more of V: 0.001% to 1%, Ti: 0.001% to 0.3%, and Nb: 0.001% to 0.3% on a mass basis.

[3] The steel sheet according to item [1] or [2], wherein the composition further contains one or two or more of Cr: 0.001% to 1.0%, Mo: 0.001% to 1.0%, Ni: 0.001% to 1.0%, B: 0.0001% to 0.0050%, and Sb: 0.001% to 0.050% on a mass basis.

[4] The steel sheet according to any one of items [1] to [3], wherein the composition further contains one or two or more of REM, Mg, and Ca of 0.0001% to 0.1% in total on a mass basis.

[5] The steel sheet according to any one of items [1] to [4], having a coating layer on a surface.

[6] The steel sheet according to item [5], wherein the composition of the coating layer contains Fe: 20.0% or less, Al: 0.001% to 3.5%, and one or two or more selected from Pb, Sb, Si, Sn, Mg, Mn, Ni, Cr, Co, Ca, Cu, Li, Ti, Be, Bi, and REM of 0% to 3.5% in total on a mass basis, the balance being Zn and inevitable impurities.

[7] The steel sheet according to item [5] or [6], wherein the coating layer is a galvannealed layer.

[8] A method for manufacturing a steel sheet, the method comprising heating a steel material having the composition according to any one of items [1] to [4] to 1150° C. to 1350° C.; performing hot-rolling including rough rolling and finish rolling in such a manner that finish rolling is completed at 820° C. or more, and coiling is then performed at 350° C. to 680° C.; cold-rolling; annealing at 820° C. or more; cooling from a cooling start temperature to a Ms temperature at an average cooling rate of 20° C./s or more; cooling from 300° C. to a cooling stop temperature of 220° C. or less at an average cooling rate of 12° C./s or less; heating, and then holding at 250° C. to 440° C. for 30 seconds or more.

[9] The method for manufacturing a steel sheet according to item [8], the method further comprising a coating treatment after the holding.

[10] The method for manufacturing the steel sheet according to item [9], wherein the coating treatment including: immersing a steel sheet after the holding in a plating bath, and an alloying treatment at 500° C. to 600° C. as needed.

According to aspects of the present invention, a steel sheet according to aspects of the present invention combines high strength, that is, a tensile strength (TS) of 950 MPa or more and excellent toughness. Applying the steel sheet according to aspects of the present invention to automotive parts allows the further weight saving of the automotive parts to be achieved.

DETAILED DESCRIPTION OF EMBODIMENTS OF THE INVENTION

Embodiments of the present invention are described below. The present invention is not limited to the embodiments below.

(Steel Sheet)

A steel sheet according to aspects of the present invention has a specific composition and a specific metallographic structure. The composition and the metallographic structure are described below in that order.

The composition of the steel sheet according to aspects of the present invention contains C: 0.07% to 0.20%, Si: 0.01% to 2.0%, Mn: 1.8% to 3.5%, P: 0.05% or less, S: 0.005% or less, Al: 0.01% to 2.0%, N: 0.0060% or less, and Si+Al: 0.7% or more on a mass basis.

The composition may further contain one or two or more of V: 0.001% to 1%, Ti: 0.001% to 0.3%, and Nb: 0.001% to 0.3% on a mass basis.

The composition may further contain one or two or more of Cr: 0.001% to 1.0%, Mo: 0.001% to 1.0%, Ni: 0.001% to 1.0%, B: 0.0001% to 0.0050%, and Sb: 0.001% to 0.050% on a mass basis.

The composition may further contain one or two or more of REM, Mg, and Ca of 0.0001% to 0.1% in total on a mass basis.

The balance is Fe and inevitable impurities. Components are described below. In descriptions below, "%" that is the unit of the content of each component refers to "mass percent".

C: 0.07% to 0.20%

C is an element that relates to the hardness of tempered martensite, which is the main metallographic structure of steel according to aspects of the present invention, and that is effective in increasing the strength of steel sheets. In order to obtain a tensile strength of 950 MPa or more, the content of C needs to be set to at least 0.07% or more. However, when the C content is greater than 0.20%, retained austenite is formed to reduce the toughness. Therefore, the range of the C content is set to 0.07% to 0.20%. The lower limit of the C content is preferably 0.09% or more, more preferably 0.10% or more, and further more preferably 0.12% or more. The upper limit of the C content is preferably 0.19% or less, more preferably 0.17% or less, further more preferably 0.15% or less, and most preferably 0.14% or less.

Si: 0.01% to 2.0%

Si is an element effective in suppressing the coarsening of iron based carbides. Good toughness can be achieved by suppressing the coarsening of the iron based carbides. In order to obtain this effect, the content of Si needs to be set to at least 0.01% or more. However, when the Si content is greater than 2.0%, negative influences on phosphatability and coatability become obvious and applications to automotive members are difficult. From the above, the range of the Si content is set to 0.01% to 2.0%. The lower limit of the Si content is preferably 0.05% or more, more preferably 0.10% or more, and further more preferably 0.20% or more. The lower limit of the Si content is preferably 1.65% or less, more preferably 1.60% or less, and further more preferably 1.55% or less.

Mn: 1.8% to 3.5%

Mn is an element that reduces the ferrite-to-austenite transformation temperature and that promotes the formation of tempered martensite, which is the main metallographic structure of steel according to aspects of the present invention. In order to obtain a desired effect due to Mn, the content of Mn needs to be set to 1.8% or more. However, when the Mn content is greater than 3.5%, retained austenite is excessively formed to impair the toughness. Therefore, the Mn content is set to 1.8% to 3.5%. The lower limit of the Mn content is preferably 1.9% or more, more preferably 2.1% or more, and further more preferably 2.3% or more. The upper limit of the Mn content is preferably 3.0% or less, more preferably 2.9% or less, and further more preferably 2.8% or less.

P: 0.05% or Less

P is an element causing low-temperature brittleness. Thus, from the viewpoint of toughness, the content of P is preferably minimized. In the present invention, a P content of up to 0.05% is acceptable. The P content is preferably 0.03% or less and more preferably 0.02% or less. Although the P content is preferably minimized, 0.002% is inevitably contained in terms of manufacture in some cases.

S: 0.005% or Less

S forms coarse sulfides in steel and these are elongated into wedge-shaped inclusions during hot-rolling, whereby the toughness is negatively affected. Therefore, the content of S is preferably minimized. In accordance with aspects of the present invention, an S content of up to 0.005% is acceptable and therefore the upper limit of the S content is set to 0.005%. The upper limit thereof is preferably 0.003% or less and more preferably 0.002% or less. Although the S content is preferably minimized, up to 0.0002% is inevitably contained in terms of manufacture in some cases.

Al: 0.01% to 2.0%

Al, as well as Si, is an element which suppresses the coarsening of iron based carbides and which is effective in improving the toughness. However, more than 2.0% negatively affects the toughness because of the formation of coarse oxides. From the above, the content of Al is set to 0.01% to 2.0%. The lower limit of the Al content is preferably 0.03% or more, more preferably 0.04% or more, and further more preferably 0.05% or more. The upper limit of the Al content is preferably 1.60% or less, more preferably 1.40% or less, and further more preferably 1.20% or less. From the viewpoint of obtaining a desired average aspect ratio, 0.7% or more Si and Al need to be contained in total. The sum is preferably 0.8% or more, more preferably 1.0% or more, and further more preferably 1.2% or more. The upper limit of the sum is preferably 2.0% or less, more preferably 1.8% or less, and further more preferably 1.6% or less.

N: 0.0060% or Less

N impairs the room-temperature aging resistance to cause unexpected cracking during bending. Therefore, the content of N is preferably minimized. In accordance with aspects of the present invention, up to 0.0060% is acceptable. The N content is preferably 0.0050% or less and more preferably 0.0040% or less. Although the N content is preferably minimized, up to 0.0005% is inevitably contained in terms of manufacture in some cases.

The above are fundamental components of the composition of the steel sheet according to aspects of the present invention and components below may be further contained.

One or two or more of V: 0.001% to 1%, Ti: 0.001% to 0.3%, and Nb: 0.001% to 0.3%

V, Ti, and Nb are elements which combine with C to form fine carbides and which thereby contribute to increasing the strength of steel sheets. However, when they are excessively contained, they are precipitated in the form of coarse carbides and therefore impair the toughness. From the above viewpoints, V: 0.001% to 1%, Ti: 0.001% to 0.3%, and Nb: 0.001% to 0.3% are set. The lower limit of the content of V is preferably 0.005% or more, more preferably 0.050% or more, and further more preferably 0.100% or more. The upper limit of the V content is preferably 0.6% or less, more preferably 0.5% or less, and further more preferably 0.4% or less. The lower limit of the content of Ti is preferably 0.005% or more, more preferably 0.010% or more, and further more preferably 0.020% or more. The upper limit of the Ti content is preferably 0.1% or less, more preferably 0.08% or less, and further more preferably 0.06% or less. The lower limit of the content of Nb is preferably 0.005% or more, more preferably 0.010% or more, and further more preferably 0.020% or more. The upper limit of the Nb content is preferably 0.1% or less, more preferably 0.08% or less, and further more preferably 0.04% or less.

One or two or more of Cr: 0.001% to 1.0%, Mo: 0.001% to 1.0%, Ni: 0.001% to 1.0%, B: 0.0001% to 0.0050%, and Sb: 0.001% to 0.050%

Cr, Mo, and Ni are elements contributing to increasing the strength of steel sheets. However, excessively adding these elements significantly varies the transformation temperature, allows no desired metallographic structure to be obtained, and impairs the toughness. B is an element which delays the progress of ferrite and bainite transformations other than a martensite transformation after annealing and which is effective in stably obtaining a desired metallographic structure. Sb is an element which segregates in a surface layer to suppress decarburization and which is effective in preventing the alteration of the microstructure of the surface layer. Even if B or Sb is excessively added, an effect is saturated, leading to a waste of an additive element. From the above viewpoints, Cr: 0.001% to 1.0%, Mo: 0.001% to 1.0%, Ni: 0.001% to 1.0%, B: 0.0001% to 0.0050%, and Sb: 0.001% to 0.050% are set. The lower limit of the content of Cr is preferably 0.010% or more, more preferably 0.030% or more, and further more preferably 0.100% or more. The upper limit of the Cr content is preferably 0.8% or less, more preferably 0.7% or less, and further more preferably 0.6% or less. The lower limit of the content of Mo is preferably 0.010% or more, more preferably 0.030% or more, and further more preferably 0.100% or more. The upper limit of the Mo content is preferably 0.6% or less, more preferably 0.5% or less, and further more preferably 0.4% or less. The lower limit of the content of Ni is preferably 0.010% or more, more preferably 0.020% or more, and further more preferably 0.030% or more. The upper limit of the Ni content is preferably 0.5% or less, more preferably 0.3% or less, and further more preferably 0.1% or less. The lower limit of the content of B is preferably 0.0003% or more, more preferably 0.0006% or more, and further more preferably 0.0009% or more. The upper limit of the B content is preferably 0.0030% or less, more preferably 0.0025% or less, and further more preferably 0.0020% or less. The lower limit of the content of Sb is preferably 0.005% or more, more preferably 0.006% or more, and further more preferably 0.007% or more. The upper limit of the Sb content is preferably 0.030% or less, more preferably 0.020% or less, and further more preferably 0.010% or less.

One or two or more of REM, Mg, and Ca of 0.0001% to 0.1% in total

The REM, Mg, and Ca are elements which spheroidize sulfides in steel to increase the toughness. Even if they are excessively added, an effect is saturated, leading to a waste of an additive element. From the above viewpoints, one or two or more of the REM, Mg, and Ca are set to 0.0001% to 0.1% in total. The lower limit of the sum of the contents thereof is preferably 0.0005% or more and more preferably 0.0010% or more. The upper limit of the sum of the contents thereof is preferably 0.02% or less and more preferably 0.0050% or less.

The balance other than the above components are Fe and inevitable impurities. Incidentally, when the content of each of the above arbitrary components is less than the lower limit, the arbitrary components are included in the inevitable impurities.

Subsequently, the metallographic structure of the steel sheet according to aspects of the present invention is described. The metallographic structure of the steel sheet according to aspects of the present invention has a ferrite area fraction of 30% or less (including 0%), a tempered martensite (temper martensite) area fraction of 70% or more (including 100%), and a retained austenite area fraction of 4.5% or less (including 0%) and is such that the average aspect ratio of an iron based carbide, precipitated in tempered martensite grains, having a grain size in the largest 10% is 3.5 or more. For the area fraction, the grain size, and the average aspect ratio, values measured and obtained by methods described in examples are used.

Ferrite area fraction of 30% or less (including 0%)

The reduction of the Ms temperature by the formation of ferrite increases untempered martensite (as-quenched martensite) or retained austenite to negatively affects the toughness. In steel according to aspects of the present invention, a ferrite area fraction of up to 30% is acceptable and therefore the upper limit thereof is set to 30%. The ferrite area fraction is preferably 25% or less, more preferably 22% or less, and further more preferably 17% or less. The ferrite area fraction may be 0%, often includes 1% or more, and includes 3% or more in some cases.

Tempered Martensite Area Fraction of 70% or More (Including 100%)

Tempered martensite (temper martensite) is a structure formed by the precipitation of an iron based carbide in a microstructure having a lath structure. Tempered martensite has a better balance of strength and toughness as compared to untempered martensite. Therefore, in accordance with aspects of the present invention, tempered martensite is selected as a main metallographic structure. In order to obtain a tensile strength of 950 MPa or more, tempered martensite needs to be 70% or more. Tempered martensite is preferably 75% or more, more preferably 80% or more, and further more preferably 85% or more. The tempered martensite area fraction may be 100%. Tempered martensite is often 98% or less.

From the viewpoint of toughness, the average size of packets of tempered martensite is preferably set to 3.5 μm or less, more preferably 3.3 μm or less, and further more preferably 3.1 μm or less. Each packet is a unit that is a group of laths sharing substantially parallel habit planes. Therefore, for tempered martensite, crystal grains with the same carbide orientation may be taken as the packet size. The lower limit of the average size thereof is not particularly limited, is usually 1.5 μm or more, and is often 2.0 μm or more.

Average aspect ratio of iron based carbide, precipitated in tempered martensite grains, having large grain size in top 10% being 3.5 or more Coarse carbides have a negative influence on the toughness. The aspect ratio (average aspect ratio) of a carbide with a grain size in the top 10% as determined by measuring the size of individual grains of a formed iron based carbide has a large influence on the toughness. When the aspect ratio of the iron based carbide is 3.5 or more, desired characteristics are obtained. The aspect ratio thereof is preferably 4.0 or more and more preferably 4.5 or more. The upper limit of the aspect ratio thereof is not particularly limited and is often 10.0 or less or 9.0 or less. The average carbide size in the top 10% is preferably 0.4 μm or less and more preferably 0.3 μm or less. The lower limit of the average carbide size is not particularly limited and is often 0.05 μm or more or 0.1 μm or more.

Retained Austenite Area Fraction of 4.5% or Less

Retained austenite reduces the toughness after bending and therefore needs to be minimized. In accordance with aspects of the present invention steel, up to 4.5% retained austenite is acceptable. Retained austenite is preferably 3.8% or less, more preferably 4.0% or less, and further more preferably 3.5% or less. The lower limit includes 0% and 0.2% is actually often formed.

A phase other than the ferrite, tempered martensite, and retained austenite may be contained. As the other phase except the above, as-quenched martensite, bainite, pearlite, and the like can be exemplified. The sum of the area fractions of these phases is preferably 5% or less.

In accordance with aspects of the present invention, from the viewpoint of toughness, retained austenite or untempered martensite (as-quenched martensite) is minimized. Retained austenite or untempered martensite tends to be increased by the reduction of the martensitic transformation start temperature (Ms temperature). Therefore, the Ms temperature is preferably set to 350° C. or more. The upper limit thereof is not particularly limited and is often 500° C. or less. The Ms temperature can be calculated by Equation (1). Equation (1) is an expression for predicting the Ms temperature in consideration of the influence of carbon partitioning during annealing as described in Reference 1 (William C. Leslie, Nariyasu Koda (translation supervisor), Leslie Steel Material Science, Maruzen, Tokyo, 1987, p. 231). Herein, [M] (M=C, Mn, Ni, Cr, or Mo) is the content (mass percent) of each element and Vf is the ferrite area fraction during annealing. The ferrite area fraction during annealing is determined with a thermal dilatometer. Upon determination, after a heat treatment simulating the heating rate, the annealing temperature, and the holding time during annealing is performed, quenching may be performed. The quenching rate is preferably as high as possible. The average cooling rate from the start of cooling to the Ms temperature is more preferably 50° C./s or more.

$$Ms \text{ temperature } (° C.)=561-474\times[C]/(1-Vf/100)-33\times[Mn]-17\times[Ni]-17\times[Cr]-21\times[Mo] \quad (1)$$

Incidentally, each of element symbols in Equation (1) refers to the content (mass percent) of a corresponding one of elements.

Subsequently, a coating layer is described. The steel sheet according to aspects of the present invention may be a steel sheet including the coating layer on a surface. Components making up the coating layer (the composition of the coating layer) are not particularly limited and may be general components. The coating layer contains, for example, Fe: 20.0% or less and Al: 0.001% to 3.5% and further contains one or two or more selected from Pb, Sb, Si, Sn, Mg, Mn, Ni, Cr, Co, Ca, Cu, Li, Ti, Be, Bi, and REM of 0% to 3.5% in total, the balance being Zn and inevitable impurities. The coating layer may be an alloyed coating layer (galvannealed layer).

The steel sheet according to aspects of the present invention has a tensile strength of 950 MPa or more as measured by a method described in an example. In usual, the steel sheet according to aspects of the present invention has a tensile strength of 1300 MPa or less. In accordance with aspects of the present invention, the tensile strength measured by the method described in the example is often 600 MPa to 1000 MPa, which is not essential to solve a problem. In accordance with aspects of the present invention, the elongation measured by a method described in an example is often 10% to 20%, which is not essential to solve a problem.

(Method for Manufacturing Steel Sheet)

Next, a method for manufacturing a high-strength coated steel sheet according to aspects of the present invention is described. The method for manufacturing the steel sheet according to aspects of the present invention includes performing hot-rolling including rough rolling and finish rolling in such a manner that a steel material is heated at 1150° C. to 1350° C., finish rolling is completed at 820° C. or more, and coiling is then performed at 350° C. to 680° C. (a hot-rolling step); performing cold-rolling (a cold-rolling step); and performing annealing at 820° C. or more, cooling from the cooling start temperature to the Ms temperature at an average cooling rate of 20° C./s or more, cooling from 300° C. to 220° C. or less, which is the cooling stop temperature, at an average cooling rate of 12° C./s or less, heating, and then holding at 250° C. to 440° C. for 30 seconds or more (an annealing step).

The hot-rolling step is a step in which hot-rolling including rough rolling and finish rolling is performed in such a manner that the steel material, which has the above composition, is heated at 1150° C. to 1350° C., finish rolling is completed at 820° C. or more, and coiling is then performed at 350° C. to 680° C.

A production process for producing the steel material is not particularly limited. A known production process such as an electric furnace or a converter can be used. Furthermore, secondary smelting may be performed in a vacuum degassing furnace. Thereafter, from productivity and quality issues, a slab (steel material) is preferably manufactured by a continuous casting process. Alternatively, the slab may be manufactured by a known casting process such as an ingot casting-blooming process or a thin slab-casting process.

Heating temperature of steel material: 1150° C. to 1350° C.

In accordance with aspects of the present invention, the metallographic structure of the steel material needs to be transformed to a substantially uniform austenite phase in such a manner that the steel material is heated prior to rough rolling. In order to suppress the formation of coarse inclusions, the control of the heating temperature is important. When the heating temperature is lower than 1150° C., a desired finishing delivery temperature cannot be obtained. However, when the heating temperature is higher than 1350° C., scale loss increases and damage to a body of a furnace is significant. Therefore, the heating temperature of the steel material is set to 1150° C. to 1350° C. The heating temperature thereof is preferably 1180° C. to 1320° C. Rough rolling conditions for rough rolling subsequent to the above heating are not particularly limited.

Finish Rolling Temperature: 820° C. or More

When the finish rolling temperature is lower than 820° C., the transformation from austenite to ferrite starts and the local strength of a steel sheet varies; hence, gauge accuracy during cold-rolling, which is the next step, deteriorates. Therefore, the finish rolling temperature is set to 820° C. or more. The finish rolling temperature is preferably 840° C. or more. The upper limit of the finish rolling temperature is not particularly limited and is usually 1060° C. or less.

Coiling Temperature: 350° C. to 680° C.

When the coiling temperature is lower than 350° C., the shape of a hot-rolled plate deteriorates and gauge accuracy after cold-rolling deteriorates. When the coiling temperature is higher than 680° C., an oxide layer incapable of being removed by pickling is formed on a surface of the hot-rolled plate to impair surface appearance after cold-rolling. From the above, the range of the coiling temperature is set to 350° C. to 680° C. The lower limit thereof is preferably 380° C. or more. The upper limit thereof is preferably 650° C. or less.

The cold-rolling step, which is subsequently performed, is a step of cold-rolling the hot-rolled plate after the hot-rolling step. In order to obtain a desired thickness, the hot-rolled plate needs to be cold-rolled after the hot-rolling step. In usual, pickling is followed by cold-rolling. Pickling conditions may be ordinary conditions.

The rolling reduction in the cold-rolling is not particularly limited and is usually 20% to 80%.

The annealing step, which is subsequently performed, is a step in which annealing is performed at 820° C. or more after the cold-rolling step; cooling is performed from the cooling start temperature to the Ms temperature at an average cooling rate of 20° C./s or more; cooling is performed from 300° C. to 220° C. or less, which is the cooling stop temperature, at an average cooling rate of 12° C./s or less; heating is performed; and holding is then performed at 250° C. to 440° C. for 30 seconds or more.

Annealing at 820° C. or More

As is clear from Equation (1), when a large amount of ferrite remains during annealing, the Ms temperature decreases and a desired steel sheet structure (metallographic structure) is not obtained. From the viewpoint of promoting the transformation from ferrite to austenite, annealing needs to be performed at 820° C. or more. Annealing is preferably performed at 830° C. or more. The upper limit is not particularly set and is substantially 900° C. or less. From the viewpoint of reducing the packet size of tempered martensite, ferrite is preferably transformed to austenite in such a manner that the recovery of dislocations is suppressed during heating. Therefore, the average heating rate from 400° C. to 700° C., at which the influence of the recovery thereof is significant, is preferably set to 50° C./s or more. The upper limit of the average heating rate from 400° C. to 700° C. is not particularly limited and is usually 100° C./s or less. From the viewpoint of suppressing the growth of austenite grains and promoting the transformation from ferrite to austenite, it is preferable that the average heating rate from 700° C. to the maximum attained temperature is set to 7° C./s or more, the maximum attained temperature is 10° C. or more higher than the annealing temperature, and cooling is performed at an average cooling rate of 0.05° C./s or more until cooling at 20° C./s or more since the maximum attained temperature. The average heating rate from 700° C. to the maximum attained temperature is usually 20° C./s or less. The maximum attained temperature is usually not higher than a temperature 15° C. higher than the annealing temperature. The average cooling rate until cooling at 20° C./s or more is usually 2.0° C./s or less. Herein, the annealing temperature refers to the temperature directly after the end of annealing. Thermometers are preferably positioned within 3 m from the exit of an annealing furnace. The average heating rate after the start of heating and the like, which are heating conditions after cold-rolling, are not particularly limited and may be appropriately set.

Cooling from cooling start temperature to Ms temperature at average cooling rate of 20° C./s or more Since it is necessary that austenite is transformed to martensite and desired tempered martensite is formed in the next and subsequent steps, a ferrite transformation and a bainite transformation need to be suppressed during cooling in this step. Therefore, cooling needs to be performed from the cooling start temperature to the Ms temperature at an average cooling rate of 20° C./s or more. The average cooling rate is preferably 30° C./s or more. The average cooling rate is usually 300° C./s or less. Herein, the cooling start temperature refers to the temperature directly after the end of annealing. In this cooling, the cooling stop temperature may be lower than or equal to the Ms temperature and is usually 140° C. to 280° C.

Cooling from 300° C. to cooling stop at an average cooling rate of 12° C./s or less A temperature range from 300° C. to 140° C. is a temperature range in which iron based carbides are significantly precipitated in martensite. An iron based carbide precipitated in this cooling has a large aspect ratio as required in accordance with aspects of the present invention and therefore this cooling is a step important in increasing the low-temperature toughness. In order to obtain a desired microstructure, cooling needs to be performed from 300° C. to cooling stop at an average cooling rate of 12° C./s or less. The average cooling rate is preferably 9° C./s or less. The average cooling rate is usually 1° C./s or more.

Cooling Stop Temperature of 220° C. or Less

In the above cooling, in order to substantially complete the martensite transformation so as not to form retained austenite, the cooling stop temperature needs to be set to 220° C. or less. The cooling stop temperature is preferably 200° C. or less. The lower temperature limit is not particularly set and about 120° C. is a lower limit because of limitations in production facilities.

Holding at 250° C. to 440° C. for 30 Seconds or More

After the above cooling, heating is performed and holding is performed at 250° C. to 440° C. for 30 seconds or more. This is effective in increasing the toughness by controlling the aspect ratio of carbides. In order to obtain a desired steel sheet structure, holding needs to be performed at 250° C. to 440° C. for 30 seconds or more. The holding time is preferably 250 seconds or less. Holding is more preferably performed at 330° C. to 430° C. for 45 seconds to 200 seconds.

In the case of manufacturing a coated steel sheet (a steel sheet including a coating layer) and a galvannealed steel sheet (a steel sheet including a galvannealed layer), immersion in a plating bath after the above step enables the coated steel sheet to be obtained or further performing galvannealing enables the galvannealed steel sheet to be obtained. Incidentally, the alloying temperature is set to 500° C. to 600° C.

EXAMPLES

Each of 250 mm thick steel materials having a composition shown in Table 1 was subjected to a hot-rolling step under hot-rolling conditions shown in Table 2, whereby a hot-rolled plate was obtained. The hot-rolled plate was subjected to a cold-rolling step at a cold-rolling reduction ratio of 28% to 65%, whereby a cold-rolled sheet was obtained. The cold-rolled sheet was annealed in a continuous annealing line or a continuous galvanizing line under conditions shown in Table 2. Vf was calculated from Equation (2) or was measured using a thermal dilatometer. Thereafter, a coating treatment was performed and an alloying treatment was performed as needed. Herein, the temperature of a plating bath (a coating composition: Zn-0.13% by mass Al) used in the continuous galvanizing line was 460° C., the coating weight of each of GI materials (galvanized steel sheets) and GA materials (galvannealed steel sheets) per unit area were set to 45 g/m² to 65 g/m², and the content of Fe contained in coating layers of the GA materials was set to the range of 6% to 14% by mass.

TABLE 1

| Steel No. | Chemical components (mass percent) | | | | | | | | | | | | | | |
|---|---|---|---|---|---|---|---|---|---|---|---|---|---|---|---|
| | C | Si | Mn | P | S | Al | N | V | Ti | Nb | Cr | Mo | Ni | B | Others |
| A | 0.10 | 1.57 | 2.54 | 0.01 | 0.003 | 0.03 | 0.0035 | — | — | — | — | — | — | — | — |
| B | 0.11 | 0.50 | 2.42 | 0.01 | 0.002 | 0.74 | 0.0035 | — | — | — | 0.35 | 0.15 | — | — | — |
| C | 0.12 | 1.20 | 2.15 | 0.01 | 0.003 | 0.04 | 0.0031 | — | — | — | — | 0.35 | — | — | — |
| D | 0.15 | 1.50 | 2.95 | 0.02 | 0.003 | 0.03 | 0.0029 | 0.034 | — | — | — | 0.20 | — | — | — |
| E | 0.13 | 1.45 | 2.77 | 0.02 | 0.002 | 0.03 | 0.0030 | — | 0.03 | 0.02 | — | 0.04 | — | 0.0012 | — |
| F | 0.14 | 0.20 | 2.74 | 0.02 | 0.001 | 1.02 | 0.0024 | — | 0.02 | — | 0.52 | 0.31 | — | 0.0010 | Ca: 0.001 Sb: 0.008 |
| G | 0.12 | 1.15 | 2.25 | 0.02 | 0.003 | 0.03 | 0.0022 | — | — | — | 0.61 | — | 0.03 | — | — |
| H | 0.13 | 1.48 | 2.75 | 0.01 | 0.001 | 0.05 | 0.0034 | 0.15 | 0.02 | 0.02 | 0.03 | 0.03 | 0.02 | 0.0011 | Mg: 0.001 REM: 0.001 |
| I | 0.06 | 1.44 | 2.85 | 0.01 | 0.002 | 0.05 | 0.0023 | — | — | — | — | — | — | — | — |
| J | 0.13 | 0.23 | 2.75 | 0.01 | 0.002 | 0.05 | 0.0026 | — | — | — | 0.34 | — | — | — | — |
| K | 0.12 | 1.06 | 1.55 | 0.01 | 0.001 | 0.04 | 0.0028 | — | — | — | — | — | — | — | — |

| Steel No. | Si + Al | Ac₃ temperature (° C.) | Remarks |
|---|---|---|---|
| A | 1.60 | 887 | Inventive example |
| B | 1.24 | 842 | Inventive example |
| C | 1.24 | 884 | Inventive example |
| D | 1.53 | 868 | Inventive example |
| E | 1.48 | 872 | Inventive example |
| F | 1.22 | 815 | Inventive example |
| G | 1.18 | 851 | Inventive example |
| H | 1.53 | 872 | Inventive example |

TABLE 1-continued

| | | | |
|---|---|---|---|
| I | 1.49 | 886 | Comparative example |
| J | 0.28 | 833 | Comparative example |
| K | 1.10 | 886 | Comparative example |

*Underlines indicate the outside of the scope of the present invention.

TABLE 2

| | | | Hot-rolling step | | | | Annealing step | | | | | | |
|---|---|---|---|---|---|---|---|---|---|---|---|---|---|
| Steel sheet No. | Steel | Surface | Slab-heating temperature (° C.) | Finishing delivery temperature (° C.) | Coiling temperature (° C.) | Cold-rolling reduction ratio (%) | Primary heating rate*1 (° C./s) | Secondary heating rate*2 (° C./s) | Maximum attained temperature (° C.) | Primary Cooling rate*3 (° C./s) | Annealing temperature (° C.) | Secondary cooling rate*4 (° C./s) | Tertiary cooling rate*5 (° C./s) |
| 1 | A | CR | 1260 | 890 | 590 | 51 | 62 | 8 | 886 | 0.2 | 871 | 28 | 5 |
| 2 | | GI | 1230 | 870 | 570 | 54 | 54 | 11 | 872 | 0.1 | 858 | 26 | 6 |
| 3 | | GA | 1240 | 850 | 570 | 65 | 63 | 8 | 865 | 0.2 | 854 | 33 | 9 |
| 4 | | CR | 1270 | 910 | 640 | 51 | 35 | 8 | 872 | 0.2 | 861 | 21 | 6 |
| 5 | | CR | 1230 | 880 | 600 | 56 | 67 | 4 | 864 | 0.2 | 854 | 35 | 5 |
| 6 | | CR | 1230 | 910 | 630 | 51 | 77 | 10 | 854 | — | 854 | 26 | 6 |
| 7 | | CR | 1240 | 880 | 610 | 52 | 79 | 10 | 828 | 0.2 | 815 | 21 | 6 |
| 8 | | CR | 1260 | 920 | 540 | 59 | 71 | 10 | 861 | 0.1 | 851 | 12 | 8 |
| 9 | | GA | 1230 | 920 | 630 | 62 | 64 | 12 | 870 | 0.1 | 856 | 33 | 15 |
| 10 | | CR | 1260 | 860 | 510 | 49 | 53 | 12 | 872 | 0.4 | 861 | 31 | 5 |
| 11 | | CR | 1270 | 870 | 560 | 61 | 76 | 7 | 867 | 0.3 | 857 | 33 | 7 |
| 12 | B | GI | 1270 | 890 | 630 | 30 | 59 | 10 | 845 | 0.2 | 835 | 30 | 9 |
| 13 | | GA | 1270 | 900 | 590 | 48 | 80 | 12 | 854 | 0.2 | 843 | 30 | 5 |
| 14 | C | GI | 1230 | 920 | 630 | 61 | 68 | 8 | 870 | 0.3 | 858 | 27 | 5 |
| 15 | | GA | 1250 | 860 | 500 | 51 | 56 | 7 | 866 | 0.2 | 852 | 30 | 7 |
| 16 | D | GI | 1230 | 890 | 500 | 45 | 81 | 8 | 871 | 0.1 | 861 | 32 | 9 |
| 17 | | GA | 1260 | 910 | 550 | 35 | 54 | 7 | 873 | 0.1 | 858 | 25 | 7 |
| 18 | E | GI | 1240 | 930 | 560 | 57 | 71 | 12 | 871 | 0.1 | 859 | 37 | 9 |
| 19 | | GA | 1260 | 850 | 590 | 28 | 71 | 11 | 866 | 0.2 | 854 | 33 | 6 |
| 20 | F | GI | 1260 | 930 | 490 | 39 | 57 | 7 | 837 | 0.2 | 825 | 31 | 8 |
| 21 | | GA | 1260 | 910 | 560 | 37 | 74 | 12 | 836 | 0.4 | 826 | 26 | 9 |
| 22 | G | GI | 1250 | 930 | 520 | 38 | 54 | 8 | 871 | 0.2 | 861 | 21 | 9 |
| 23 | | GA | 1240 | 920 | 610 | 60 | 79 | 9 | 863 | 0.4 | 853 | 36 | 9 |
| 24 | H | GI | 1240 | 860 | 510 | 61 | 54 | 8 | 872 | 0.1 | 853 | 21 | 9 |
| 25 | | GA | 1240 | 880 | 470 | 60 | 77 | 11 | 872 | 0.1 | 853 | 24 | 6 |
| 26 | I | GA | 1270 | 870 | 550 | 51 | 78 | 8 | 873 | 0.3 | 861 | 26 | 7 |
| 27 | J | GA | 1270 | 880 | 590 | 29 | 61 | 9 | 869 | 0.4 | 858 | 34 | 7 |
| 28 | K | GA | 1270 | 910 | 620 | 34 | 59 | 9 | 870 | 0.1 | 859 | 38 | 5 |

| | Annealing step | | | | | |
|---|---|---|---|---|---|---|
| Steel sheet No. | Cooling stop temperature (° C.) | Post-cooling holding temperature (° C.) | Post-cooling holding time (s) | Vf (%) | Ms temperature (° C.) | Remarks |
| 1 | 162 | 344 | 34 | 6 | 427 | Inventive example |
| 2 | 190 | 426 | 113 | 18 | 420 | Inventive example |
| 3 | 197 | 346 | 44 | 23 | 416 | Inventive example |
| 4 | 169 | 374 | 96 | 14 | 422 | Inventive example |
| 5 | 173 | 370 | 76 | 23 | 416 | Inventive example |
| 6 | 185 | 422 | 82 | 23 | 416 | Inventive example |
| 7 | 166 | 345 | 74 | 74 | 295 | Comparative example |

TABLE 2-continued

| | | | | | | |
|---|---|---|---|---|---|---|
| 8 | 184 | 335 | 33 | 27 | 412 | Comparative example |
| 9 | 183 | 415 | 94 | 20 | 418 | Comparative example |
| 10 | 169 | 440 | 97 | 14 | 422 | Inventive example |
| 11 | 197 | <u>480</u> | 56 | 19 | 419 | Comparative example |
| 12 | 172 | 396 | 107 | 1 | 419 | Inventive example |
| 13 | 186 | 374 | 57 | 0 | 420 | Inventive example |
| 14 | 197 | 399 | 42 | 14 | 416 | Inventive example |
| 15 | 167 | 391 | 117 | 21 | 410 | Inventive example |
| 16 | 173 | 348 | 74 | 1 | 387 | Inventive example |
| 17 | 171 | 363 | 77 | 2 | 387 | Inventive example |
| 18 | 196 | 347 | 75 | 4 | 405 | Inventive example |
| 19 | 193 | 363 | 63 | 7 | 402 | Inventive example |
| 20 | 182 | 330 | 107 | 0 | 389 | Inventive example |
| 21 | 194 | 344 | 102 | 0 | 389 | Inventive example |
| 22 | 194 | 342 | 51 | 1 | 418 | Inventive example |
| 23 | 165 | 398 | 81 | 0 | 419 | Inventive example |
| 24 | 187 | 382 | 30 | 8 | 402 | Inventive example |
| 25 | 161 | 430 | 106 | 8 | 402 | Inventive example |
| 26 | 168 | 363 | 621 | 13 | 434 | Comparative example |
| 27 | 181 | 396 | 780 | 0 | 403 | Comparative example |
| 28 | 197 | 397 | 188 | 15 | 443 | Comparative example |

*1Primary heating rate = the average heating rate from 400° C. to 700° C..
*2Secondary heating rate = the average heating rate from 700° C. to the maximum attained temperature.
*3Primary Cooling rate = the average cooling rate from the maximum attained temperature to just before the start of post-annealing cooling.
*4Secondary Cooling rate = the average cooling rate from the start of post-annealing cooling to the Ms temperature.
*5Tertiary cooling rate = the average cooling rate from 300° C. to the stop of cooling.
*Underlines indicate the outside of the scope of the present invention.

Specimens were taken from cold-rolled steel sheets (CR materials), galvanized steel sheets, or galvannealed steel sheets obtained as described above and were evaluated by techniques below.

(i) Microstructure Observation

The area fraction of each phase was evaluated by a technique below. A specimen was cut out from each steel sheet such that a cross section parallel to a rolling direction was an observation surface. A through-thickness central portion thereof was revealed by corrosion using 1% nital. Ten fields of view were photographed at a ¼t position (t is a thickness) from a surface of the steel sheet in a thickness direction at 2,000× magnification using a scanning electron microscope. A ferrite phase is a microstructure having morphology in which no corrosion mark or cementite is observed in a grain. Tempered martensite is a microstructure in which a large number of fine cementite having orientations and corrosion marks are observed in a grain. The area fraction of each of the ferrite phase, tempered martensite, and microstructures, such as as-quenched martensite and bainite, other than these was determined. The results were shown in Table 3.

The area fraction of retained austenite was determined on the basis of X-ray diffraction intensity in such a manner that one-fourth of the steel sheet was ground in a thickness direction and a surface of the steel sheet that was chemically polished by 200 μm or more was measured. An incident radiation source used was a Mo Kα radiation and peaks of $(200)_\alpha$, $(211)_\alpha$, $(200)_\gamma$, $(220)_\gamma$, and $(311)_\gamma$ were measured.

For the packet size of tempered martensite, after packet boundaries were determined using image analysis software (Image-Pro Plus ver. 7.0, developed by NIPPON ROPER K.K.), the equivalent circle diameter was determined by image analysis. The average of grain sizes was shown in Table 3. A packet is a group of variants having substantially the same habit plane (Reference 2: Goro Miyamoto, Takeshi Kaneshita, Tadachika Chiba, and Tadashi Furuhara, *Journal of the Japan Institute of Metals and Materials*, vol. 79, p. 339 (2015)). Likewise, for the grain size of iron based carbides in tempered martensite, after the outline of each carbide was determined using image analysis software (Image-Pro Plus ver. 7.0, developed by NIPPON ROPER K.K.), the equivalent circle diameter was determined by image analysis. A histogram of individual equivalent circle diameters was prepared and the average grain size and average aspect ratio of carbides having a large grain size in the top 10% were determined. The aspect ratio was determined from (major axis length)/(minor axis length). Incidentally, for the about image analysis, the following images were used: images (scanning electron micrographs) that were taken by an electron backscatter diffraction technique (EBSD technique) in such a manner that the number of photographing times and the magnification were the same as area fraction measurement conditions.

(ii) Tensile Test

JIS No. 5 tensile specimens were prepared from each obtained steel sheet in a direction perpendicular to the rolling direction and were subjected to a tensile test in accordance with standards of JIS Z 2241 (2011) five times, whereby the average yield strength (YS), tensile strength (TS), and elongation (El) were determined. The cross head speed in the tensile test was set to 10 mm/min. In Table 3, a tensile strength of 950 MPa or more was defined as a mechanical property of a steel sheet required in accordance with aspects of the present invention steel.

(iii) Toughness Evaluation

For the evaluation of toughness, end-ground specimens having a width of 100 mm and a length of 35 mm were used and a V-bending test in which (punch radius)/(sheet thickness) was 3.0 was performed. The stroke rate was set to 50 ram/min, the maximum load was set to 80 kN, and the maximum load-holding time was set to 5 seconds. Whether a bending ridge line had a defect was visually investigated. One having a crack noticed by visual observation was unacceptable and was rated "x". Incidentally, one having a crack noticed at the moment of the bending test was No. 27. After the bending test, samples were immersed in a −120° C. or −80° C. antifreeze for 5 minutes, immediately followed by a U-bending test with a punch radius of 1.0 mm. One in which no crack (judged by visual observation) occurred at the point in time when a punch was 5 mm pushed after the punch was brought into contact with a sample was a steel sheet having toughness required in accordance with aspects of the present invention and was rated "○". A brittle-fractured steel sheet was unacceptable and was rated "x". The results were shown in Table 3.

TABLE 3

| | Metallographic structure | | | | | | | Mechanical properties of steel sheet | | | | | |
|---|---|---|---|---|---|---|---|---|---|---|---|---|---|
| | | Tempered | | | Area | | | | | | | Toughness evaluation | |
| Steel Sheet No. | Ferrite area fraction (%) | martensite area fraction (%) | Retained austenite (%) | Type of another phase*5 | fraction of another phase (%) | Packet size (μm) | Carbide grain size*1 (μm) | Carbide aspect ratio*2 | Yield strength (MPa) | Tensile strength (MPa) | Total elongation (%) | Rating 1*3 | Rating 2*4 | Remarks |
| 1 | 7.8 | 89.8 | 2.4 | — | 0.0 | 2.9 | 0.2 | 5.0 | 753 | 991 | 15 | ○ | ○ | Inventive example |
| 2 | 18.7 | 78.6 | 2.7 | — | 0.0 | 2.3 | 0.2 | 7.8 | 759 | 961 | 14 | ○ | ○ | Inventive example |
| 3 | 24.6 | 71.6 | 1.5 | FM | 2.3 | 2.1 | 0.1 | 5.2 | 670 | 957 | 15 | ○ | ○ | Inventive example |
| 4 | 14.4 | 84.3 | 1.3 | — | 0.0 | 3.7 | 0.2 | 7.8 | 678 | 955 | 16 | ○ | x | Inventive example |
| 5 | 23.0 | 76.1 | 0.9 | — | 0.0 | 3.6 | 0.1 | 6.9 | 786 | 958 | 15 | ○ | x | Inventive example |
| 6 | 22.6 | 75.1 | 2.3 | — | 0.0 | 3.8 | 0.1 | 4.5 | 772 | 965 | 15 | ○ | x | Inventive example |
| 7 | <u>75.0</u> | <u>11.0</u> | <u>5.6</u> | FM | 8.4 | 2.6 | 0.2 | 7.9 | 712 | <u>925</u> | 19 | x | x | Comparative example |
| 8 | <u>36.0</u> | <u>52.4</u> | <u>4:9</u> | B, FM | 6.7 | 2.3 | 0.3 | 4.3 | 809 | <u>941</u> | 18 | x | x | Comparative example |
| 9 | 21.1 | 70.5 | 2.3 | FM | 6.1 | 2.8 | 0.3 | <u>3.1</u> | 786 | 958 | 15 | x | x | Comparative example |
| 10 | 15.4 | 82.2 | 2.4 | — | 0.0 | 2.2 | 0.5 | 3.7 | 764 | 955 | 15 | ○ | x | Inventive example |
| 11 | 19.9 | 78.6 | 1.5 | — | 0.0 | 2.2 | 0.6 | <u>3.2</u> | 666 | 952 | 16 | x | x | Comparative example |
| 12 | 1.3 | 97.6 | 1.1 | — | 0.0 | 3.1 | 0.2 | 5.4 | 842 | 1002 | 15 | ○ | ○ | Inventive example |
| 13 | 1.0 | 98.0 | 1.0 | — | 0.0 | 3.1 | 0.2 | 6.4 | 810 | 1000 | 15 | ○ | ○ | Inventive example |
| 14 | 15.4 | 81.2 | 1.3 | FM | 2.1 | 3.3 | 0.2 | 6.2 | 790 | 1039 | 13 | ○ | ○ | Inventive example |
| 15 | 21.3 | 76.5 | 2.2 | — | 0.0 | 3.5 | 0.1 | 4.5 | 806 | 1033 | 14 | ○ | ○ | Inventive example |
| 16 | 1.3 | 96.9 | 1.8 | — | 0.0 | 2.9 | 0.1 | 8.0 | 1021 | 1230 | 13 | ○ | ○ | Inventive example |
| 17 | 2.5 | 94.6 | 2.9 | — | 0.0 | 3.1 | 0.2 | 7.6 | 953 | 1222 | 12 | ○ | ○ | Inventive example |
| 18 | 4.0 | 92.2 | 2.7 | FM | 1.1 | 3.3 | 0.1 | 7.5 | 802 | 1015 | 14 | ○ | ○ | Inventive example |
| 19 | 9.2 | 88.9 | 1.0 | FM | 0.9 | 3.1 | 0.2 | 6.7 | 833 | 1016 | 15 | ○ | ○ | Inventive example |

TABLE 3-continued

| | Metallographic structure | | | | | | | Mechanical properties of steel sheet | | | | | |
|---|---|---|---|---|---|---|---|---|---|---|---|---|---|
| Steel Sheet No. | Ferrite area fraction (%) | Tempered martensite area fraction (%) | Retained austerite (%) | Type of another phase*5 | Area fraction of another phase (%) | Packet size (μm) | Carbide grain size*1 (μm) | Carbide aspect ratio*2 | Yield strength (MPa) | Tensile strength (MPa) | Total elongation (%) | Toughness evaluation Rating 1*3 | Rating 2*4 | Remarks |
| 20 | 1.0 | 97.7 | 1.3 | — | 0.0 | 3.2 | 0.3 | 5.9 | 806 | 1008 | 14 | ○ | ○ | Inventive example |
| 21 | 0.0 | 97.3 | 1.2 | FM | 1.5 | 2.9 | 0.3 | 6.5 | 800 | 1000 | 15 | ○ | ○ | Inventive example |
| 22 | 3.3 | 92.3 | 3.0 | FM | 1.4 | 3.0 | 0.1 | 7.3 | 857 | 1058 | 14 | ○ | ○ | Inventive example |
| 23 | 1.0 | 95.3 | 3.7 | — | 0.0 | 3.2 | 0.3 | 4.8 | 828 | 1061 | 14 | ○ | ○ | Inventive example |
| 24 | 9.0 | 89.8 | 1.2 | — | 0.0 | 3.5 | 0.1 | 5.3 | 747 | 996 | 15 | ○ | ○ | Inventive example |
| 25 | 10.0 | 87.5 | 2.5 | — | 0.0 | 2.8 | 0.1 | 4.6 | 804 | 992 | 14 | ○ | ○ | Inventive example |
| 26 | 13.4 | 82.6 | 1.0 | B | 3.1 | 2.2 | 0.2 | 6.8 | 647 | <u>924</u> | 15 | ○ | ○ | Comparative example |
| 27 | 0.0 | 99.3 | 0.7 | — | 0.0 | 2.7 | 0.7 | <u>2.4</u> | 811 | 989 | 15 | x | x | Comparative example |
| 28 | <u>35.0</u> | <u>55.2</u> | <u>5.3</u> | B | 4.5 | 2.6 | 0.1 | 7.9 | 759 | <u>914</u> | 17 | ○ | ○ | Comparative example |

*1The average grain size of carbides within the top 10% of the size of iron based carbides.
*2The average aspect ratio of carbides within the top 10% of the size of iron based carbides.
*3U-bending evaluation after −80° C. immersion.
*4U-bending evaluation after −120° C. immersion.
*5FM: as-quenched martensite, B: bainite
* Underlines indicate the outside of the scope of the present invention.

It is clear that inventive examples all have a tensile strength TS of 950 MPa or more and obtained good toughness. However, comparative examples which are outside the scope of the present invention have a tensile strength of less than 950 MP or obtained no good result in toughness evaluation.

The invention claimed is:
1. A steel sheet having,
a composition containing
C: 0.07% to 0.20%,
Si: 0.01% to 2.0%,
Mn: 1.8% to 3.5%,
P: 0.05% or less,
S: 0.005% or less,
Al: 0.01% to 2.0%,
N: 0.0060% or less, and
Si+Al: 0.7% or more on a mass basis, the balance being Fe and inevitable impurities; and
a metallographic structure containing:
a ferrite area fraction of 30% or less (including 0%),
a tempered martensite area fraction of 70% or more (including 100%),
and a retained austenite area fraction of 4.5% or less (including 0%), wherein the average aspect ratio of an iron based carbide, precipitated in tempered martensite grains, having a grain size in the largest 10% of the iron based carbide is 3.5 or more,
wherein the steel sheet has a tensile strength of 950 MPa or more and 1300 MPa or less.
2. The steel sheet according to claim 1, wherein the composition further contains one or two or more selected from at least one group of A to C
group A
V: 0.001% to 1%,
Ti: 0.001% to 0.3%, and
Nb: 0.001% to 0.3% on a mass basis,
group B
Cr: 0.001% to 1.0%,
Mo: 0.001% to 1.0%,
Ni: 0.001% to 1.0%,
B: 0.0001% to 0.0050%, and
Sb: 0.001% to 0.050% on a mass basis,
group C
REM, Mg, and Ca of 0.0001% to 0.1% in total on a mass basis.
3. The steel sheet according to claim 1, having a coating layer on a surface.
4. The steel sheet according to claim 2, having a coating layer on a surface.
5. The steel sheet according to claim 3, wherein the composition of the coating layer contains Fe: 20.0% or less, Al: 0.001% to 3.5%, and one or two or more selected from Pb, Sb, Si, Sn, Mg, Mn, Ni, Cr, Co, Ca, Cu, Li, Ti, Be, Bi, and REM of 0% to 3.5% in total on a mass basis, the balance being Zn and inevitable impurities.
6. The steel sheet according to claim 4, wherein the composition of the coating layer contains Fe: 20.0% or less, Al: 0.001% to 3.5%, and one or two or more selected from Pb, Sb, Si, Sn, Mg, Mn, Ni, Cr, Co, Ca, Cu, Li, Ti, Be, Bi, and REM of 0% to 3.5% in total on a mass basis, the balance being Zn and inevitable impurities.
7. The steel sheet according to claim 3, wherein the coating layer is a galvannealed layer.
8. The steel sheet according to claim 4, wherein the coating layer is a galvannealed layer.

9. The steel sheet according to claim 5, wherein the coating layer is a galvannealed layer.

10. The steel sheet according to claim 6, wherein the coating layer is a galvannealed layer.

11. The steel sheet according to claim 1, wherein an average size of packets of tempered martensite is set to 3.5 µm or less.

12. A method for manufacturing the steel sheet according to claim 1, the method comprising
   heating a steel material having the composition according to claim 1 to 1150° C. to 1350° C.;
   performing hot-rolling including rough rolling and finish rolling in such a manner that finish rolling is completed at 820° C. or more, and coiling is then performed at 350° C. to 680° C.;
   cold-rolling;
   annealing at 820° C. or more;
   cooling from a cooling start temperature to a Ms temperature at an average cooling rate of 20° C./s or more;
   cooling from 300° C. to a cooling stop temperature of 220° C. or less at an average cooling rate of 12° C./s or less;
   heating, and then holding at 250° C. to 440° C. for 30 seconds or more.

13. A method for manufacturing the steel sheet according to claim 2, the method comprising
   heating a steel material having the composition according to claim 2 to 1150° C. to 1350° C.;
   performing hot-rolling including rough rolling and finish rolling in such a manner that finish rolling is completed at 820° C. or more, and coiling is then performed at 350° C. to 680° C.;
   cold-rolling;
   annealing at 820° C. or more;
   cooling from a cooling start temperature to a Ms temperature at an average cooling rate of 20° C./s or more;
   cooling from 300° C. to a cooling stop temperature of 220° C. or less at an average cooling rate of 12° C./s or less;
   heating, and then holding at 250° C. to 440° C. for 30 seconds or more.

14. The method for manufacturing a steel sheet according to claim 12, the method further comprising a coating treatment after the holding.

15. The method for manufacturing a steel sheet according to claim 13, the method further comprising a coating treatment after the holding.

16. The method for manufacturing the steel sheet according to claim 14, wherein the coating treatment including: immersing a steel sheet after the holding in a plating bath, and an alloying treatment at 500° C. to 600° C. as needed.

17. The method for manufacturing the steel sheet according to claim 15, wherein the coating treatment including: immersing a steel sheet after the holding in a plating bath, and an alloying treatment at 500° C. to 600° C. as needed.

18. The method for manufacturing a steel sheet according to claim 12, wherein
   an average heating rate during annealing from 400° C. to 700° C. is 50° C./s or more;
   an average heating rate during annealing from 700° C. to a maximum attained temperature of 10° C. or more higher than an annealing temperature is 7° C./s or more; and
   a cooling rate during annealing from the maximum attained temperature to the annealing temperature is 0.05° C./s or more and 2.0° C./s or less.

19. The method for manufacturing a steel sheet according to claim 13, wherein
   an average heating rate during annealing from 400° C. to 700° C. is 50° C./s or more;
   an average heating rate during annealing from 700° C. to a maximum attained temperature of 10° C. or more higher than an annealing temperature is 7° C./s or more; and
   a cooling rate during annealing from the maximum attained temperature to the annealing temperature is 0.05° C./s or more and 2.0° C./s or less.

* * * * *